United States Patent [19]

Carman et al.

[11] 3,726,307

[45] Apr. 10, 1973

[54] PRESSURE CONTROL APPARATUS

[75] Inventors: Richard J. Carman; Paul R. Benson, both of Spring, Tex.

[73] Assignee: Cameron Iron Works, Inc., Houston, Tex.

[22] Filed: Dec. 9, 1971

[21] Appl. No.: 206,481

[52] U.S. Cl..............................137/487.5, 303/20
[51] Int. Cl..........................G05d 11/00, F16k 31/02
[58] Field of Search ..................137/487.5; 303/20; 246/182; 73/4

[56] References Cited

UNITED STATES PATENTS

| | | | |
|---|---|---|---|
| 2,047,734 | 7/1936 | Hetzer | 137/487.5 X |
| 3,017,556 | 1/1962 | Smoot | 137/487.5 X |
| 3,266,288 | 8/1966 | Andresen, Jr. | 137/487.5 X |
| 3,402,972 | 9/1968 | Cooper et al. | 137/487.5 X |
| 3,527,241 | 9/1970 | Bristow et al. | 137/487.5 X |

Primary Examiner—Henry T. Klinksiek
Assistant Examiner—Robert J. Miller
Attorney—W. F. Hyer et al.

[57] ABSTRACT

Control apparatus is disclosed for regulating fluid pressure in a fluid system between predetermined lower and upper limits of such pressure by comparing electrical voltages proportional to the fluid pressure in said system and to said lower and upper limits of pressure. Electrical control signals are generated in response to differences in the compared voltages to actuate solenoid operated valves connected in the fluid system for increasing the fluid pressure in the system when below said lower limit, and decreasing said fluid pressure when above said upper limit. The specific embodiment of the control system described is connected to control the pilot pressure of a pilot operated hydraulic pressure regulator.

12 Claims, 5 Drawing Figures

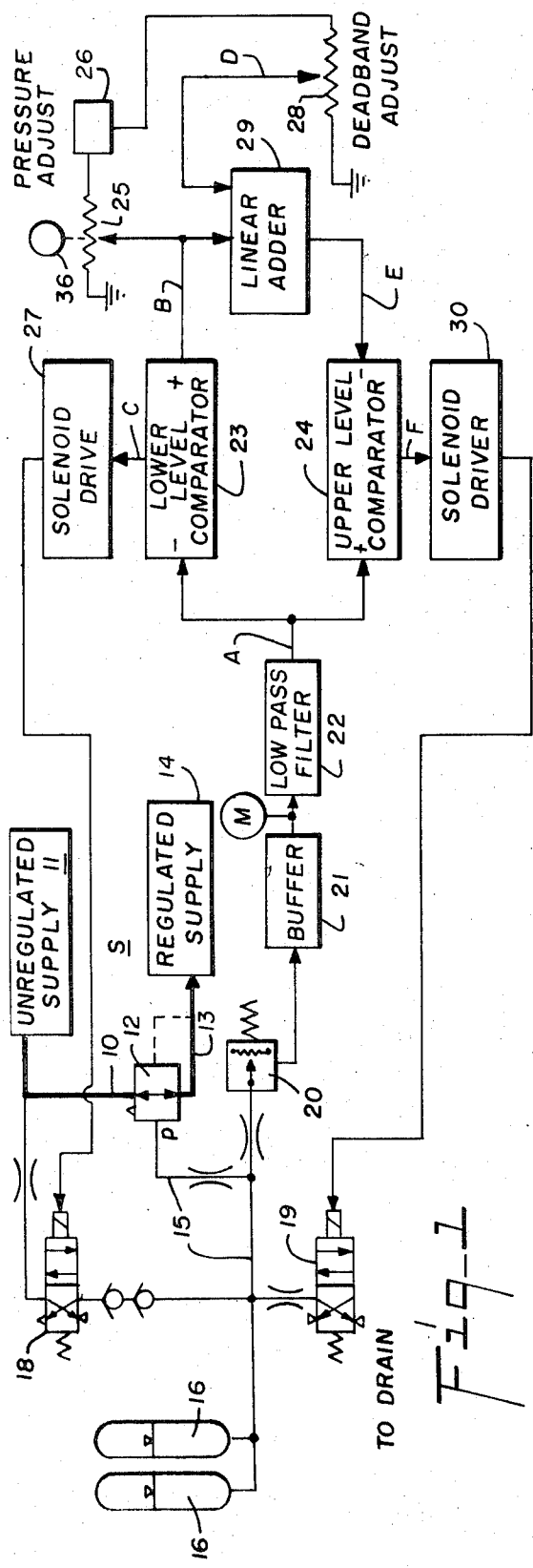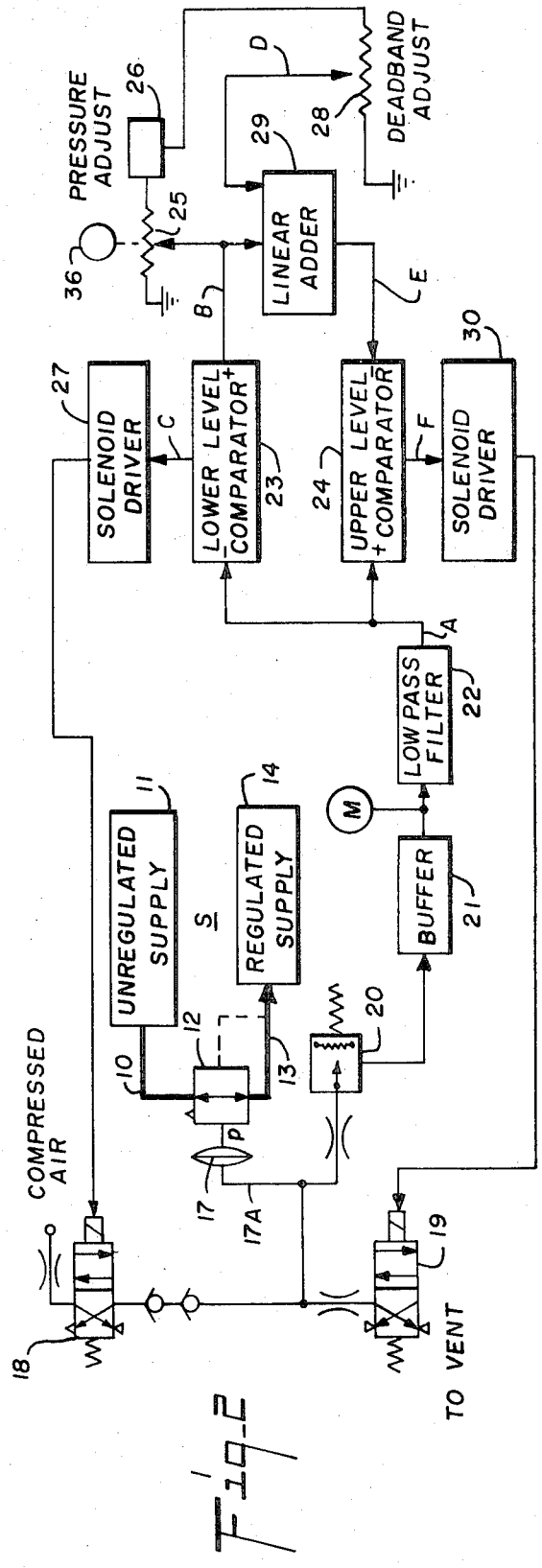

PRESSURE CONTROL APPARATUS

This invention relates to the control of fluid pressure and in one of its aspects to electrical control apparatus for regulating fluid pressure in a fluid system. In another aspect it relates to such electrical control apparatus for controlling the pilot pressure of a pilot operated hydraulic pressure regulator.

In the past, many types of fluid pressure control apparatus using either pneumatic, hydraulic, or electrical signals, or combinations of these signals for control or information functions, have been provided. These control apparatus generally provide a closed loop feedback system in which pneumatic, hydraulic, or electrical signals generated in response to a difference in the pressure being controlled and a desired pressure are utilized to increase or decrease the pressure being controlled until it is at substantially the desired pressure level. Although the type of control apparatus chosen for a particular control application depends on many factors, in some applications it is preferable to use electrical apparatus and electrical signals where possible. This is particularly true where information or control signals must travel relatively long distances, such as where control of the fluid system is to be provided from a remote location, because the speed of response of electrical apparatus to pressure changes is generally faster than that of pneumatic or hydraulic control apparatus. Also, many of the circuit components in electrical control system apparatus are generally smaller and lighter, less costly, and subject to less maintenance since they do not involve mechanical parts. This is particularly true where solid state and integrated circuit electronics can be employed in the control apparatus.

A good example of where electrical pressure control apparatus may be preferred is in the control of pressure at a subsea structure, such as a subsea blowout preventer or Christmas tree, which may be located several miles from a surface platform where control is initiated at a control console. In such use the electrical control apparatus may control the pressure of a subsea flow line or the pilot pressure of a hydraulic pressure regulator which in turn controls the pressure of a subsea flow line, such as the pressure utilized to operate the rams of a blowout preventer.

However, even with electrical pressure control apparatus, the electrical signals generated actuate mechanical devices, such as solenoid or motor operated valves, to cause pressure to be added or removed from the fluid system being controlled. Because such mechanical devices and the fluid system itself generally have slower response times to pressure changes than the electrical apparatus employed, it has been difficult in the past to prevent the control apparatus from cycling or oscillating when the pressure to be controlled reaches or approaches the desired pressure. This problem has also been termed as one of "hunting" or "overshooting" and can result in unstable operation of the control apparatus. One prior suggestion for improving the stability of electrical pressure control apparatus is found in Cooper et al., U.S. Pat. No. 3,402,972, where an electronic timing circuit is provided which has a timing cycle proportional to the magnitude of an error signal generated in response to a difference between a pressure being controlled and a desired pressure. This timing circuit is used to inhibit a gate circuit which controls the operation of mechanical apparatus used to change the pressure being controlled in the fluid system. In this manner, the mechanical apparatus is actuated to add or remove pressure only during the timing cycle, and the period of this timing cycle depends on the magnitude of pressure increase or decrease needed. However, in Cooper, the relationship between the duration of the timing cycle and the speed of response of the fluid flow system being controlled is critical because if too short, then the fluid system may never balance, or if too long, it may oscillate until the end of the timing cycle. Also, the Cooper control apparatus is used with a closed loop air braking system where the pressure changes involved generally fall within known limits and is not readily adaptable to use where the time response of the mechanical elements employed or the fluid system may be different or unknown, such as may occur when the fluid system is a subsea fluid flow line. Also, pressure control provided in Cooper is not readily adjustable over a wide range of pressures.

It is thus an object of this invention to provide electrical pressure control apparatus for regulating the pressure in a fluid system and in which instability of the control apparatus, such as described, is more effectively reduced than in prior such control apparatus.

It is another object of this invention to provide such electrical pressure control apparatus in which a critical relationship between the time response of the control apparatus and the time response of the fluid system is not required.

Another object of this invention is to provide such electrical control in which both the pressure to be maintained and the amount of control over instability of the control apparatus is readily adjustable.

Also, where pressure is a hydraulic flow system is being regulated by a pilot pressure controlled hydraulic regulator the response time of the pilot pressure system is generally faster and more suited to precise control with better resolution than that of the hydraulic flow system. Thus, another object of this invention is to provide such electrical control apparatus which may be readily adapted to control the pilot pressure of a pilot operated hydraulic regulator.

These and other objects of this invention, which will become more apparent upon consideration of the attached drawings, description herein, and appended claims, are accomplished according to this invention by providing electrical control apparatus which maintains the pressure in the flow system being regulated between predetermined lower and upper limits of desired pressure. These limits of pressure provide a dead band of pressure in which the electrical control apparatus does not respond to changes in pressure. The control between such lower and upper limits is provided in the preferred embodiment illustrated by comparing a first electrical voltage from a pressure transducer which is proportional to fluid pressure in the flow system, to electrical reference voltages proportional to said lower and upper limits of pressure. Electrical control signals are generated in a comparator circuits means in response to differences in the compared voltages to actuate pressure control means, such as solenoid operated valves, connected in the fluid system for increasing or decreasing fluid pressure in the flow system as needed. One of the electrical reference voltages compared to the electrical voltage proportional to fluid pressure in the flow system may be a first reference voltage provided by a first electrical circuit means and proportional to substantially the lower limit of pressure to be maintained. The other reference voltage so compared may be a second reference voltage provided by a second electrical circuit means and proportional to substantially the upper limit of pressure to be maintained. In the preferred embodiment illustrated, the second circuit means includes a linear adder circuit and said second reference signal is obtained by adding a voltage substantially proportional to the difference in pressure between the lower and upper limits of the dead band to the first reference voltage. The width of the dead band need not be critical and will depend on the degree of pressure control desired, and the spread in pressure required to prevent overshot between the pressure limits. The first and second electrical circuit means may include variable resistors so that the magnitude of the first and second reference voltage, and thus the upper and lower limits of the dead band, may be varied. Also, the control of pressure in the fluid system may be further stabilized by providing means in the lower and upper comparator circuits which provide controlled amounts of hysteresis about each of the lower and upper limits of pressure to avoid erratic operation of the solenoid valves. Further, the frequency response of the electrical control apparatus can be controlled by filtering out higher frequency responses to flow transients in the flow system in a filter means, such as a low pass filter circuit connected to the output of the pressure transducer. In this manner. Further stability of the control apparatus is provided.

In the drawings, wherein like reference numerals are used throughout to designate like parts, and wherein are illustrated preferred embodiments of this invention, FIG. 1 is a block diagram of a preferred form of electrical pressure control apparatus of this invention being utilized to control the hydraulic pilot pressure of a pilot operated hydraulic regulator;

FIG. 2 is a block diagram of the electrical pressure control apparatus and hydraulic regulator of FIG. 1, except that the pilot pressure being controlled is pneumatic;

Figure 4B:
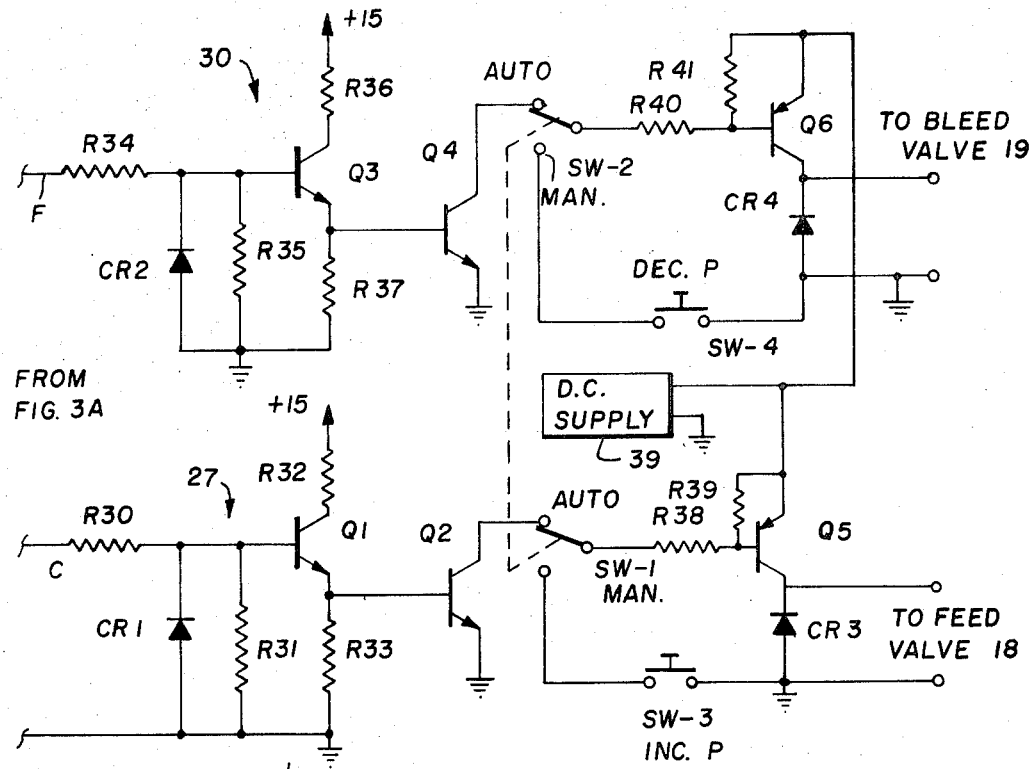
FIG. 4B is the remaining part of the detailed schematic of the electrical pressure control apparatus of FIGS. 1 and 2.

Referring now to the drawings, in each of FIGS. 1 and 2, a fluid system S is illustrated as including a flow conduit 10 connected to an unregulated source 11 of hydraulic fluid and to an inlet of hydraulic regulator 12. The output of hydraulic regulator 12 provides a regulated source of hydraulic fluid and is connected by a conduit 13 to an utility device 14 which may, for example, by a blowout preventer located at a subsea oil well location. The hydraulic regulating function of regulator 12 is controlled by a pilot fluid pressure at an inlet P of regulator 12, and the electrical pressure control apparatus of this invention to be described in conjunction with FIGS. 1 and 2 is utilized to provide a regulated pilot pressure to inlet P. In the FIG. 1 embodiment, the pilot pressure at inlet P is hydraulic whereas it is pneumatic in the FIG. 2 embodiment. An example of such a regulator with capability of being operated by either pilot air or a pilot hydraulic fluid is the Payne Hydro-Pneumatic Regulator manufactured by the Payne Control Systems Group of Cameron Iron Works, Inc., assignee of the present invention. Of course, as can be readily understood by those skilled in the art upon consideration of the description to follow, the electrical pressure control apparatus of this invention is suitable for controlling the pressure in many different types of fluid systems provided for many different types of applications.

In FIG. 1, the pilot pressure fluid system connected to inlet P includes a conduit 15 connected to fluid accumulators 16 in which a quantity of hydraulic fluid is stored under pressure to provide the pilot pressure at inlet P. The accumulators 16 may be Payne Hydro-Pneumatic Accumulators manufactured by the Payne Control Systems Group of Cameron Iron Works, Inc., assignee of the present invention, and their gas precharge pressures and volumes are determined so that the regulator pilot pressure change is relatively linear over a wide range of pressures. In FIG. 2, an air diaphragm 17 functions as an accumulator to provide the pilot pressure at inlet P in response to pressure in a conduit 17A connected to the inlet of diaphragm 17.

In the event that the pilot pressure in the conduit 15 of FIG. 1 or the conduit 17A of FIG. 2 goes above or falls below pressures to be maintained, pressure control means is provided in each of the pilot pressure systems of the embodiment of FIGS. 1 and 2 for increasing or decreasing the pilot pressure as needed. As illustrated in FIG. 1, the pressure control means includes a solenoid operated valve 18 connected between conduit 10 and conduit 15 to function as a feed valve, and a solenoid operated valve 19 connected between a drain (not shown) and conduit 15 to function as a bleed valve. The pressure control means in the FIG. 2 embodiment includes a solenoid operated valve 18 connected between a source (not shown) of compressed air and conduit 17A to function as a feed valve, and a solenoid operated valve 19 connected between conduit 17A and an air vent (not shown) to function as a bleed valve. Suitable check valves and flow restrictions are provided in the pilot systems of FIGS. 1 and 2 as needed to complete these systems.

Each of solenoid operated valves 18 and 19 are spring loaded and are normally closed. They respond to an electrical control signal of predetermined magnitude to move from their closed position to an open position, and to removal of such a signal to return back to their normally closed position. When open, valves 18 add fluid pressure to the pilot pressure systems of FIGS. 1 and 2, and when open valves 19 permit the removal of pressure from these systems. The electrical control signals for operating these valves are provided by the electrical control apparatus of this invention to be described.

Figure 3:
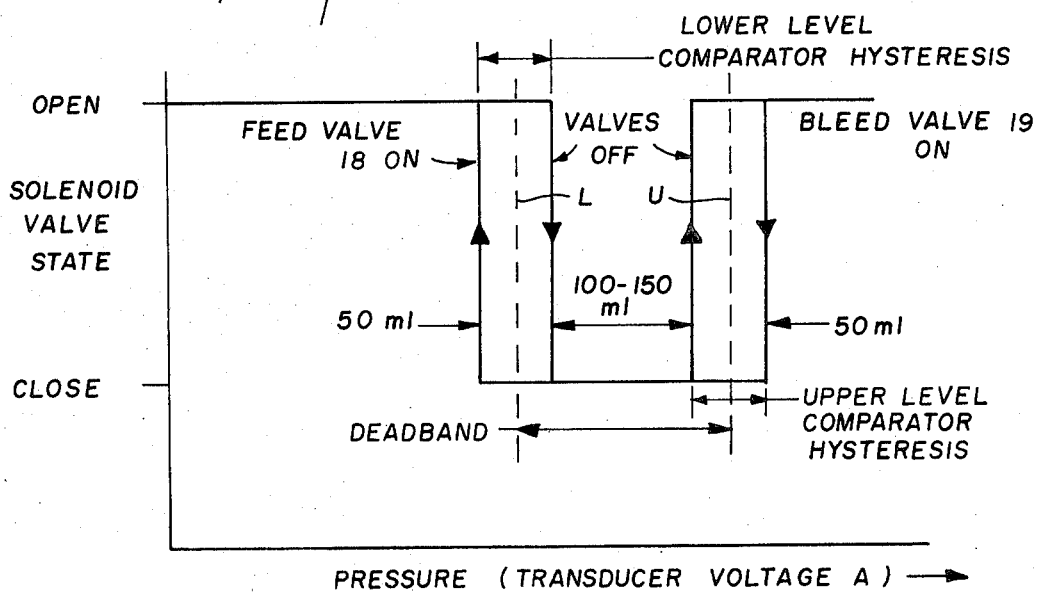
FIG. 3 is a graph showing the relationship between the turn on and turn off times of the control valves of FIGS. 1 and 2 and the magnitude of the pilot pressure being regulated.

An important feature of the present invention is that pilot pressure in the pilot pressure system of either FIGS. 1 or 2 is maintained within lower and upper limits of pressure, which limits form a dead band of pressure between these limits in which pressure changes do not actuate the control apparatus. This dead band is illustrated in FIG. 3 as a band of pilot pressure between a lower limit L and an upper limit U. Thus, feed valve 18 opens when the pilot pressure is at or near the lower limit of the dead band, and bleed valve 19 opens when the pilot pressure is at or near the upper limit of the dead band. The lower and upper limits L and U of the dead band, i.e., its width, are selected so that any pressure overshoot that is likely to occur as the pressure is raised or lowered falls within the dead band and will not affect the operation of the control apparatus.

Connected in the pilot pressure fluid systems of both FIGS. 1 and 2 is a pressure transducer means which responds to the pilot pressure therein to provide a first electrical signal proportional to that pressure. In the preferred embodiments illustrated in FIGS. 1 and 2, this means includes a pressure transducer 20 connected to sense the pressure in lines 15 in FIG. 1, or the pressure in line 17A in FIG. 2, a buffer circuit 21 connected to the output of transducer 20, and a low pass filter circuit 22 connected to the output of buffer circuit 21. Buffer circuit 21 serves as an impedance matching circuit for transducer 20 permitting the use of long connecting cables between transducer 20 and buffer circuit 21, and places negligible loading on transducer 20. Low pas filter circuit 22 serves to filter out electrical signals from buffer 21 and transducer 20 that are generated in response to flow transients, so that the system only responds to pressure changes of significant duration, and the output signal A from filter circuit 22 functions as a first electrical signal proportional to the pressure in the pilot systems of FIG. 1 or FIG. 2. Further details of the circuits 21 and 22, and their functions, as well as the details of the remaining circuits of FIGS. 1 and 2, will be described with respect to the description of the detailed schematic of FIGS. 4A and 4B.

The output signal A of filter circuit 22 is conducted to the input of a comparator circuit means which in the embodiments illustrated in FIGS. 1 and 2 includes a lower level comparator circuit 23 and an upper level comparator circuit 24. Each of comparator circuits 23 and 24 are preferably differential amplifiers and the negative input of comparator circuit 23 is connected to the output of filter circuit 22, and the positive input of comparator circuit 24 is connected to the output of filter circuit 22. First electrical circuit means, which in the embodiments illustrated includes a potentiometer or variable resistor 25 connected to a voltage source 26, provides a first reference electrical signal B which is preferably a voltage substantially proportional in magnitude to the lower limit of pressure to be maintained in the pilot pressure systems of FIGS. 1 or 2. Variable resistor 25 serves as a pressure adjust potentiometer setting the lower limit of desired pressure, and the wiper arm of variable resistor 25 is connected to the positive input of comparator circuit 23. Comparator circuit 23 compares signals A and B and provides a first electrical control signal C at its output responsive to a difference in magnitude of signals A and B when signal A is smaller than signal B, i.e., when the pressure represented by signal A is below the desired lower level pressure represented by signal B. The output of comparator circuit 23 is connected to a solenoid drive amplifier 27 which is connected at its output to solenoid operated valve 18, and amplifier 27 responds to signal C to provide an electrical output of sufficient magnitude to cause valve 18 to open when the pressure in the pilot pressure system of FIGS. 1 and 2 is below the desired lower limit of pressure.

A second electrical circuit means is also provided which provides a second reference electrical signal substantially proportional to the upper limit of pressure to be maintained in the pilot pressure systems of FIGS. 1 and 2. In the embodiments illustrated, this means includes a potentiometer or variable resistor 28 connected to voltage source 26, and a linear adder circuit 29 connected between the wiper arms of variable resistors 25 and 28 and upper level comparator 24. Variable resistor 28 serves as a dead band adjust potentiometer, and the voltage D provides at its wiper arm is proportional to the difference between the lower and upper limits of pressure to be maintained in the pilot pressure system of FIGS. 1 and 2. Linear adder circuit 29 responds to voltage B at the wiper arm of variable resistor 25 and to the voltage D at the wiper arm of variable resistor 28 and adds these voltages to provide an output voltage E which functions as the second reference electrical signal proportional to the upper limit of pressure to be maintained. The output voltage E is conducted to the negative input of comparator circuit 24 and is continuously compared with the magnitude of signal A so that a second electrical control signal F is provided at the output of comparator circuit 24 when the voltage level of signal A exceeds the voltage level of signal D, i.e., when the pilot pressure in the systems of FIGS. 1 and 2 exceeds a desired upper limit of pressure. Signal F is conducted to the input of a solenoid drive amplifier 30 which is connected to solenoid operated valve 19 and responds to signal F to provide an electrical output signal of sufficient magnitude to cause valve 19 to open to remove pressure from the pilot pressure system of FIGS. 1 and 2.

It is preferred that each of the comparator circuits 23 and 24 include means (described with respect to FIGS. 4A and 4B) for providing a controlled amount of hysteresis on either side of the lower and upper limits of the dead band, as illustrated to FIG. 3, so that the feed valve 18 comes on when the pilot pressure to be maintained in conduits 15 and 17A is some small controlled amount below the lower limit L of the dead band, and goes off when the pilot pressure is a small controlled amount above the lower limit L of the dead band. Similarly, with such hysteresis, the bleed valve 19 would come on when the pilot pressure is a small controlled amount above the upper limit U of the dead band, and go off when the pilot pressure is a small controlled amount below the upper limit U of the dead band. In this manner, each of the valves 18 and 19 will not oscillate or cycle about the respective limit L or U that it controls, further adding to the stability of the control apparatus.

Figure 4A:
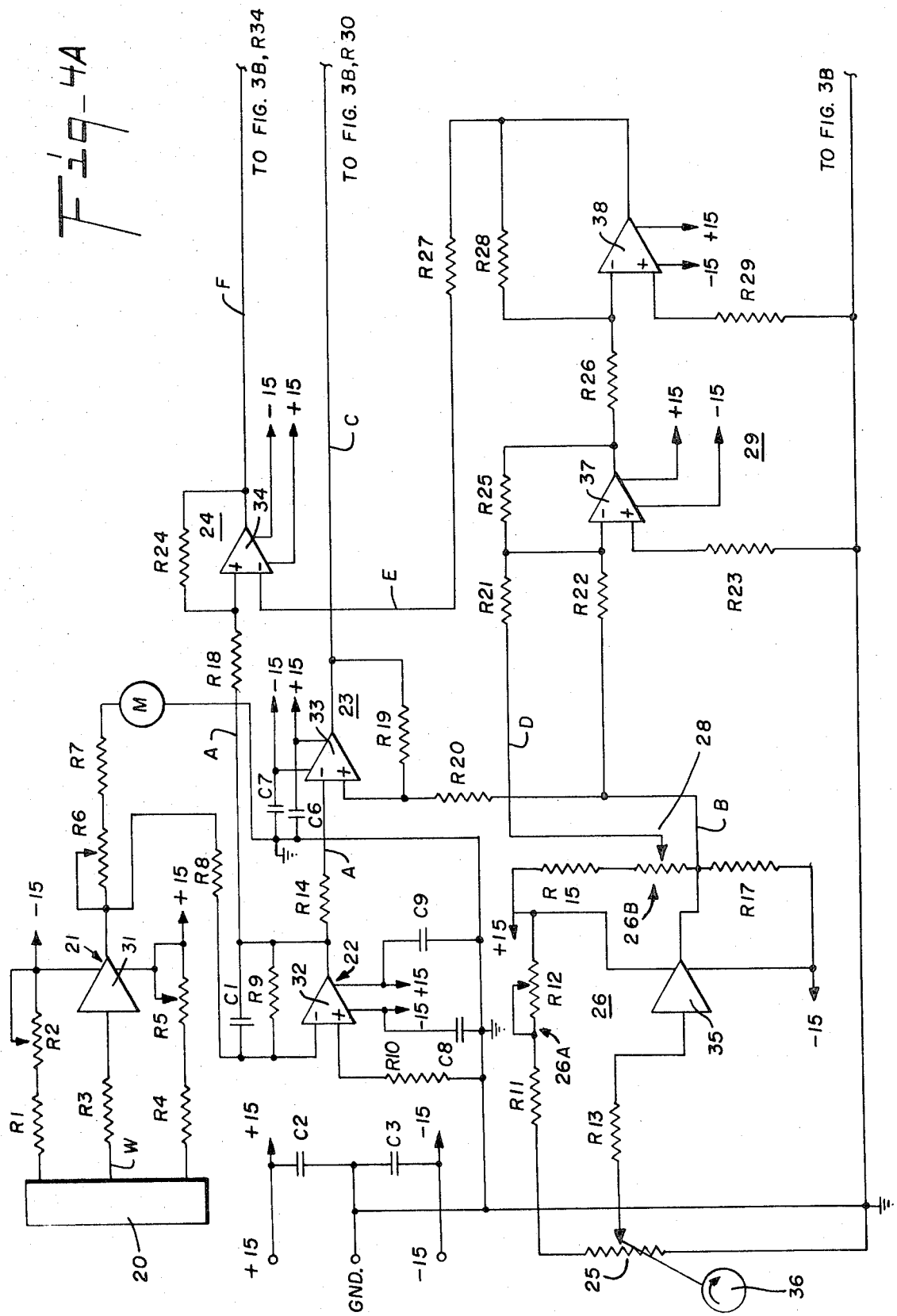
FIG. 4A is the first part of a detailed schematic of the electrical pressure control apparatus of FIGS. 1 and 2.

Referring now to FIGS. 4A and 4B, a complete detailed schematic of a preferred form of electrical circuits used in the control apparatus of either of FIGS. 1 or 2 is illustrated. The letters used to designate the various circuit output signals in FIGS. 1 and 2 are used to designate comparable signals in FIGS. 4A and 4B.

Pressure transducer 20 may be a Bourns 5316 with a 0-3000 psi pressure rating when the hydraulic pilot pressure of conduit 15 in FIG. 1 is being regulated. Transducer 20 functions as a variable resistor or potentiometer and is connected by its high and low voltage terminals to scaling potentiometers or variable resistors R2 and R5 and by its wiper arm or output signal terminal W to the input of buffer circuit 21. Potentiometer R2 is connected to a negative supply of voltage (illustrated as −15 volts) and potentiometer R5 to a positive supply of voltage (illustrated as −15 volts) and by adjustment of these potentiometers, the zero and full scale levels of transducer 20 can be scaled so that 0-10 volts is provided at terminal W to represent 0-3000 psi in conduit 15 and 17A. Buffer circuit 21 includes an operational amplifier 31 connected as a unity gain buffer to function as previously noted. The output of amplifier 31 may be connected through a meter scaling potentiometer R6 to a meter M which provides a direct reading of the pressure in conduits 15 or 17A, and which may be mounted on a control console (not shown). The output of amplifier 31 is also connected through resistor R8 to the negative input of an operational amplifier 32 which, with its associated circuit components, including capacitor C1 and resistor R9, provides low pass filter circuit 22. The positive input of amplifier 32 is connected to ground through resistor R10. Capacitor C1 and resistor R9 are connected in shunt with each other and from the output of amplifier 32 to the negative input thereof. C1 and R9 control the frequency response to amplifier 32 so that output signals from buffer 31 which have a very short duration, such as flow transients, or which occur at a relative high frequency, are filtered out or attenuated. In this manner, the response time of the electrical apparatus is slowed to where it is more compatable with the response time of the fluid system being controlled, and the overall stability of the electrical control apparatus is improved. Typical values of capacitor C1 and resistor R9 and 1 microfarad and 22,100 ohms respectively when the system being controlled is a pilot pressure system such as illustrate d in FIGS. 1 and 2. However, because of the dead band feature of the present invention, the frequency response of filter circuit 22 is not critical and does not impair the ability of the pressure control apparatus to respond to varying pressure conditions in the pressure system being controlled, but only sets a maximum frequency of response.

The output of amplifier 32 (which is signal A in FIGS. 1 and 2) is connected to the negative input of a difference amplifier 33, which with its associated components provide lower level comparator 23, and to the positive input of a difference amplifier 34, which with its associated components provide upper level component circuit 24. In the embodiment illustrated, each of amplifiers 33 and 34 are Fairchild μA741 type operational amplifiers with neglible feedback so that they have very high gain. These amplifiers become saturated when the difference in their input signals is a very small amount (for example 1 millivolt) so that their output is substantially two state, i.e., either low or high depending on the relationship of the input signals. The positive input of difference amplifier 33 is connected to the output of a unity gain buffer 35 which supplies first reference electrical signal B to this input so that the input signals A and B to amplifier 33 are continuously compared to provide output signal C in response to a difference in magnitude of signals A and B. Buffer 35 functions to place negligible loading at the wiper arm of variable resistor 25. The input of buffer 35 is connected to the wiper arm of variable resistor 25 which is in turn connected in series in a voltage divider string 26A also including resistors R11, and R12. Resistor R12 is variable to set the full scale of variable resistor 25, and is connected to a source (not shown) of +15 volts. Variable resistor 25 is preferably mounted on the front panel of a control console and may be a ten turn potentiometer with its shaft controlled by a dial 36 with suitable markings that may be directly read as the set or desired lower limit of pressure for the pilot pressure system of FIGS. 1 and 2. Resistor R12, however, need not be mounted on the front panel of the control console. A second voltage divider string 26B is also provided and includes resistors R15 and R17 and variable resistor 28, and voltage divider 26B is connected between sources (not shown) of +15 and −15 volts. Voltage divider strings 26A and 26B thus provide source 26 of reference voltages B and D. The wiper arm of variable resistor 28 (at signal level D) is connected through resistor R21 to the input of an operational amplifier 37 and signal B from the output of amplifier 35 is also connected to the input of amplifier 37 through a resistor 22. Amplifier 37 provides unity gain of the sum of the input signals, but its output is inverted, so that its output signal is substantially at the signal level of −(B+D). This output signal is conducted through a resistor R26 to the input of an operational amplifier 38 which also is connected as a unity gain amplifier, and its output is inverted to provide a signal substantially equal to B+D, which is signal E. Amplifiers 37 and 38, and their associated components, thus comprise linear adder circuit 29 and this circuit maintains a linear relationship between signals E and B as signal B is varied. Output signal E is conducted from amplifier 38 through a resistor R27 to the negative input of difference amplifier 34 so that the magnitude of signals A and E are continuously compared to provide signal F at the output of amplifier 34 which is responsive to a difference in the voltage levels of signals A and E.

Difference amplifier 33 preferably includes a feedback resistor R19 connected between its output and its positive input, and difference amplifier 34 preferably includes a similar feedback resistor R24 connected between its output and its positive input. Resistors R19 and R24 along with resistors R14 and R18 permit amplifiers 33 and 34 to provide a controlled amount of hysteresis between the turn on and turn off voltage levels of valves 18 and 19, as illustrated in FIG. 3, by adding or subtracting a small feedback or offset voltage from output signals C and F to or from the positive inputs of amplifiers 33 and 34, depending on whether signal A is increasing or decreasing. In the embodiment illustrated with 0-10 volts from transducer 20 representing 0-3000 psi in the pilot pressure system of FIG. 1 being regulated, a typical width for the dead band may be 100 to 150 millivolts (i.e., 30 to 45 psi), and typical widths for the lower and upper level hysteresis may be 50 millivolts (i.e., 15 psi). In this case, typical values for resistors R14 and R18 may be 4990 ohms, and 5 meg. ohms for resistors R19 and R24. These values may be determined from well-known formulas pertaining to operational amplifiers which relate the values of these resistors to the width of hysteresis desired to compensate for pressure overshoots about the limits L and U.

The polarity of output signals C and F from difference amplifiers 33 and 34 depend on which of their input signal has the higher voltage level. Thus, signal C will be positive when signal A is smaller than reference signal B, which is the condition present when the pressure in either of conduits 15 or 17A is below the set lower limit L. Also signal F will be positive when signal A is larger than reference signal E which is the condition present when the pressure in either conduits 15 or 17A is greater than the desired upper limit U. Thus, in the embodiment illustrated, solenoid drive circuits 27 and 30 (see FIG. 4B) are designed to only respond to signals C and F when these signals are positive. The output of amplifier 33 is connected to the input of solenoid drive circuit 27 which includes transistors Q1, Q2 and Q5 and their associated components. The base of transistor Q1 functions as the input of circuit 27 and signal C is thus conducted to the base of transistor Q1. A diode CR1 is connected from the base of Q1 to ground the diode CR1 clips signal C when of negative polarity. Thus, only signal C with a positive polarity and of a sufficient magnitude to drive transistor Q1, and the subsequent stages of drive circuit 27, will cause feed valve 18 to open. Similarly, solenoid driven circuit 30 includes transistors Q3, Q4 and Q6 and their associated components and signal F is conducted to the base of transistor Q3 which functions as the input of this circuit. A diode CR2 is connected from the base of transistor Q3 to ground and serves to clip signal F when of negative polarity so that only signal F with a positive polarity and of sufficient magnitude to drive transistor Q3, and the subsequent stages of drive circuit 30, will cause bleed valve 19 to open. In drive circuit 27, transistor Q1 drives transistor Q2 which is in turn connected through a switch SW-1 to drive transistor Q5, which functions as a power switch for conducting electrical current to feed valve 18. In drive circuit 30, transistor Q3 drives transistor Q4 which is in turn connected to switch SW-2 to drive transistor Q6 which functions as a power switch for conducting electrical current to bleed valve 19.

As illustrated in FIG. 4B, solenoid valves 18 and 19 may be operated by switching power from a DC power supply 39 through transistors Q5 and Q6. Transistors Q5 and Q6 are connected at their emitters to supply 39 and diodes CR3 and CR4 are connected to the collectors of transistors Q5 and Q6 to clip negative spikes from the voltage operating valves 18 and 19. Also, in the embodiment illustrated, switches SW-1 and SW-2 are provided on the control console to permit automatic regulation of the pilot pressure in the conduits 15 or 17A, under control of the electrical apparatus of this invention, or manual control of this pressure through switches SW-3 and SW-4 also located on the control panel. Solenoid operated valves 18 and 19 and transducer 20 may be remotely located from the remainder of the electrical control apparatus described.

In use of the electrical control apparatus of this invention, the width of the dead band used and the width of the lower and upper level hysteresis will depend on a number of related factors. An important factor is the speed of response of the solenoid control valves 18 and 19. For example, with the pneumatic pilot system of FIG. 2, the values 18 and 19 normally operate faster than in the hydraulic system of FIG. 1, and a narrower dead band and less hysteresis can be used. Also, another factor is the speed of response of the fluid system being regulated and by proper use of flow resistors or needle valves in the pilot systems of FIGS. 1 and 2, the response time of the fluid system can be more closely regulated and the width of the dead band narrowed. One important feature of this invention is that the control apparatus described permits easy adjustment of the width of the dead band to accommodate different control applications. For example, if the FIG. 1 embodiment with hydraulic pilot fluid is being regulated, the dead band may be set at 150 millivolts whereas it would be set at 100 millivolts for regulation of the FIG. 2 embodiment with pilot air. In both cases, the lower and upper hysteresis can be fixed at 50 millivolts. Because of the flexibility provided by the adjustable dead band, the frequency response of filter 22 and the width of the lower and upper limit hysteresis can generally be set once for use in many different control applications.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Control apparatus for maintaining fluid pressure in a fluid system substantially within lower and upper limits of such pressure wherein such a fluid system includes pressure control means responsive to a first electrical control signal to increase pressure in said system and to a second electrical control signal to decrease pressure in said system, said apparatus comprising, in combination: pressure transducer means adapted to respond to fluid pressure in such a system to provide a first electrical signal proportional thereto; first electrical circuit means for providing a first reference electrical signal that is proportional to substantially said lower limit of fluid pressure; second electrical circuit means for providing a second reference electrical signal that is proportional to substantially said upper limit of fluid pressure; and comparator circuit means connected to said pressure transducer means and said first and second electrical circuit means and responsive to a difference between said first reference signal and said first electrical signal to provide said first electrical control signal when said fluid pressure is below said lower limit, and responsive to a difference between said second reference electrical signal and said first electrical signal to provide said second electrical control signal when said fluid pressure is above said upper limit.

2. The apparatus of claim 1 wherein said comparator circuit means includes a lower level comparator circuit responsive to said first electrical signal and said first reference signal to provide said first electrical control signal, and an upper level comparator circuit responsive to said first electrical signal and said second reference electrical signal to provide said second electrical control signal.

3. The apparatus of claim 1 wherein said first reference electrical signal is a first voltage substantially proportional in amplitude to said lower limit of pressure, and said second reference electrical signal comprises said first voltage plus a second voltage substantially proportional in amplitude to the pressure difference between said lower and upper limits, and wherein said second electrical circuit means includes a linear adder circuit connected to said first electrical circuit means and responsive to said first voltage to provide said second voltage.

4. The apparatus of claim 2 wherein said first reference electrical signal is a first voltage substantially proportional in amplitude to said lower limit of pressure, and said second reference electrical signal comprises said first voltage plus a second voltage substantially proportional in amplitude to the pressure difference between said lower and upper limits, and wherein said second electrical circuit means includes a linear adder circuit connected to said first electrical circuit means and responsive to said first voltage to provide said second voltage.

5. The apparatus of claim 1 further including means for inhibiting operation of said control apparatus when pressure changes occur in said fluid system at a rate greater than a predetermined frequency.

6. The apparatus of claim 5 wherein said last mentioned means is provided by said pressure transducer means.

7. The apparatus of claim 5 wherein said last mentioned means is a lower pass filter circuit.

8. The apparatus of claim 2 wherein each of said lower and upper level comparators includes means for providing a controlled amount of hysteresis about said lower and upper limits of pressure.

9. In combination with a fluid system including pressure control means responsive to a first electrical control signal to increase fluid pressure in said fluid system, and responsive to a second electrical control signal to decrease fluid pressure in said system, control apparatus for providing said first and second electrical control signals to maintain said pressure substantially within lower and upper limits of such pressure, said control apparatus comprising; pressure transducer means adapted to respond to fluid pressure in such a system to provide a first electrical signal proportional thereto; first electrical circuit means for providing a first reference electrical signal that is proportional to substantially said lower limit of fluid pressure; said electrical circuit means for providing a second reference electrical signal that is proportional to substantially said upper limit of fluid pressure; and comparator circuit means connected to said pressure transducer means and said first and second electrical circuit means and responsive to a difference between said first reference signal and said first electrical signal to provide said first electrical control signal when said fluid pressure is below said lower limit, and responsive to a difference between said second reference electrical signal and said first electrical signal to provide said second electrical control signal when said fluid pressure is above said upper limit 10. The system of claim 1 wherein said comparator circuit means includes a lower level comparator circuit responsive to said first electrical signal and said first reference signal to provide said first electrical control signal, and an upper level comparator circuit responsive to said first electrical signal and said second reference electrical signal to provide said second electrical control signal.

11. The system of claim 9 wherein said pressure control means includes a lower level solenoid controlled valve adapted to be connected between said fluid system and a source of fluid pressure and responsive to said first electrical control signal to add fluid pressure to said fluid system, and an upper level solenoid valve adapted to be connected between said fluid system and a drain and responsive to said second electrical control signal to remove fluid pressure from said fluid system.

12. The system of claim 9 wherein said fluid system further includes a pilot operated pressure regulator and the fluid pressure to be regulated is the pilot pressure of said regulator.

* * * * *